(12) United States Patent
Osorio

(10) Patent No.: US 10,583,796 B2
(45) Date of Patent: Mar. 10, 2020

(54) DOOR BARRIER FOR A VEHICLE AND VEHICLE HAVING SAME

(71) Applicant: Honda Motor Co., Ltd., Tokyo (JP)

(72) Inventor: Sebastian Osorio, Columbus, OH (US)

(73) Assignee: Honda Motor Co., Ltd., Tokyo (JP)

(*) Notice: Subject to any disclaimer, the term of this patent is extended or adjusted under 35 U.S.C. 154(b) by 163 days.

(21) Appl. No.: 15/937,393

(22) Filed: Mar. 27, 2018

(65) Prior Publication Data
US 2019/0299898 A1    Oct. 3, 2019

(51) Int. Cl.
| | | |
|---|---|---|
| *B60R 21/06* | (2006.01) | |
| *B60J 5/04* | (2006.01) | |
| *B60R 21/13* | (2006.01) | |
| *B60R 21/02* | (2006.01) | |

(52) U.S. Cl.
CPC ............ *B60R 21/06* (2013.01); *B60J 5/0487* (2013.01); *B60R 21/13* (2013.01); *B60R 2021/028* (2013.01); *B60Y 2200/124* (2013.01)

(58) Field of Classification Search
CPC ........................... B60R 21/06; B60R 2021/028
See application file for complete search history.

(56) References Cited

U.S. PATENT DOCUMENTS

| | | | |
|---|---|---|---|
| 8,123,279 B2 | 2/2012 | Orr et al. | |
| 8,292,352 B2 | 10/2012 | Furman et al. | |
| 8,308,223 B2 * | 11/2012 | King ..................... | B60J 5/0487 112/470.33 |
| 8,465,050 B1 * | 6/2013 | Spindler ................. | B60R 21/06 280/749 |
| 8,696,006 B2 | 4/2014 | Sanschagrin et al. | |
| 8,714,591 B1 * | 5/2014 | Kobayashi .............. | B60R 21/06 248/72 |
| 9,150,181 B2 | 10/2015 | Schroeder et al. | |
| 9,365,241 B1 * | 6/2016 | Taracko ............... | B62D 23/005 |
| 9,475,367 B1 * | 10/2016 | Wilson, III ........... | B60J 5/0487 |
| 9,487,174 B2 * | 11/2016 | Szewczyk .............. | B60R 21/06 |
| 9,663,145 B2 * | 5/2017 | Schroeder ............. | B62D 21/11 |
| 2011/0241325 A1 * | 10/2011 | King ......................... | B60J 5/08 280/756 |
| 2012/0161477 A1 * | 6/2012 | Furman .................. | B60J 5/0487 296/203.03 |
| 2013/0087394 A1 * | 4/2013 | Sanschagrin .......... | B60J 5/0487 180/54.1 |
| 2014/0306487 A1 * | 10/2014 | Dobrot ................... | B60J 5/0487 296/190.03 |
| 2015/0175114 A1 * | 6/2015 | Schroeder ............... | B60R 21/06 296/190.03 |

\* cited by examiner

*Primary Examiner* — James A English
(74) *Attorney, Agent, or Firm* — Honda Patents & Technologies North America, LLC; Clifford B Vaterlaus

(57) ABSTRACT

A door barrier assembly for a vehicle can include a flexible barrier member such as a net, flexible plastic screen, or other barrier device located within an opening in the vehicle frame. The vehicle frame can include a front pillar member connected to a longitudinally extending roll cage member that extends in a longitudinal rearward direction of the vehicle from a top end of the front pillar member. The front pillar member can also be connected to a transverse roll cage member. The flexible barrier member can include an upper forward portion and a connector at the upper forward portion releasably attached to one of the transverse roll cage member and the longitudinally extending roll cage member at a location between the front pillar member and the longitudinally extending roll cage member.

20 Claims, 10 Drawing Sheets

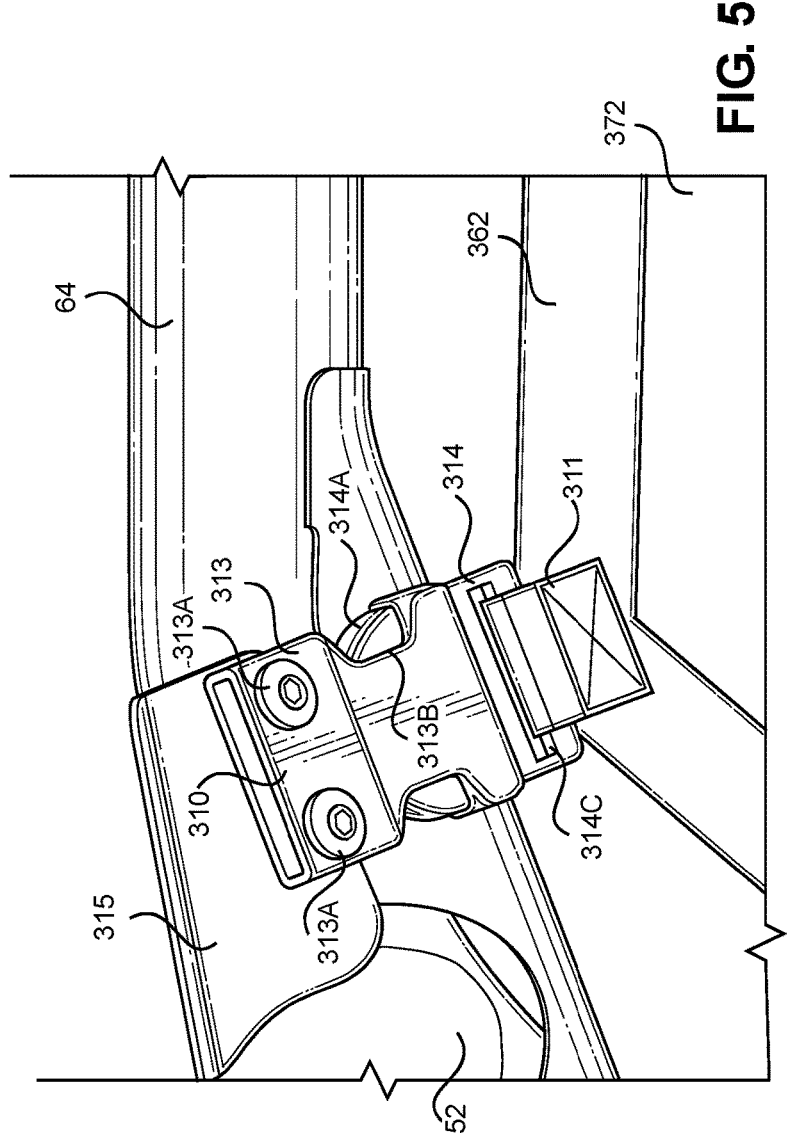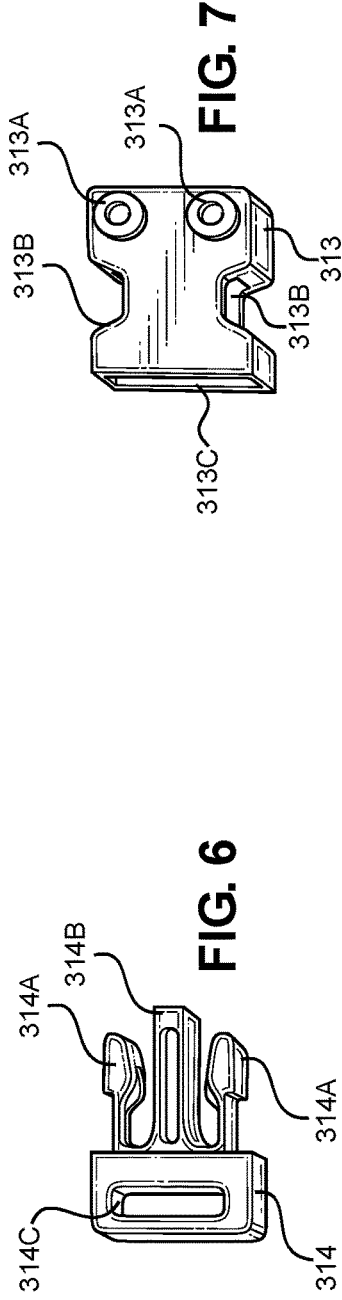

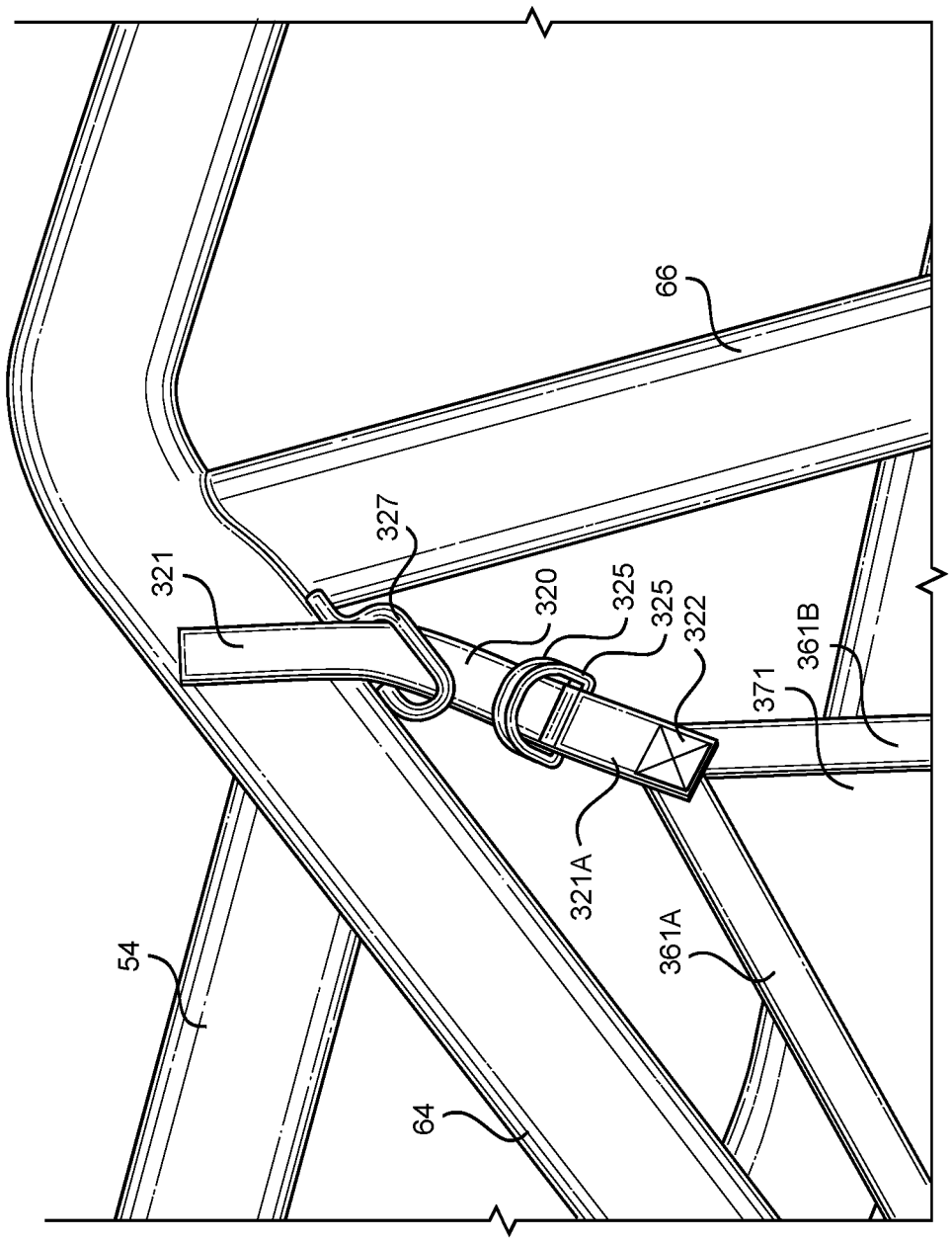

DOOR BARRIER FOR A VEHICLE AND VEHICLE HAVING SAME

BACKGROUND

The disclosed subject matter relates to a vehicle and a door barrier and frame assembly for the vehicle. More particularly, the disclosed subject matter relates to methods and apparatus that provide quick and easy access to a vehicle while providing a protective barrier for use while the vehicle is operating. The protective barrier can prevent ingress and egress of various objects, materials, and light, to/from the vehicle and passenger compartment. The barrier can also prevent passengers of the vehicle (including the driver) from exiting or extending a portion of their body out of the door or window of the vehicle.

Vehicles, such as but not limited to all-terrain vehicles, can be subjected to relatively large load and/or energy inputs to the frame assembly due to the unevenness of the terrain across which the vehicle is travelling. Thus, typical door frames and windows are not often used in such vehicles. The all-terrain vehicle can include a generally rigid frame assembly that is designed to withstand the load and energy inputs transmitted from the wheels and through the suspension components during travel over the uneven terrain. For example, space constraints and off-road durability may make it beneficial to provide very stiff portions of the vehicle frame that are spaced from the passenger area, such as but not limited to frame structures around the front suspension components, rear suspension components and/or powertrain components. There is a need for window or door barrier components that do not effect the rigidity characteristics of the frame, while also providing sufficient protection to the passengers, and allowing easy access to the passenger compartment.

SUMMARY

Some embodiments are directed to a door barrier assembly for a vehicle that can include a vehicle frame, a flexible barrier member, and a releasable buckle. The vehicle frame can include a first cage side member having a longitudinal axis extending in a vertical rearward direction of the vehicle and a second cage side member having a longitudinal axis extending in a longitudinal direction of the vehicle. The first cage side member can be connected at a front connection location to the second cage side member and the second cage side member can extend in a longitudinal rearward direction of the vehicle from a top end of the first cage side member. The first cage side member and second cage side member can define a window portion of the vehicle. The flexible barrier member can be located in the window portion of the vehicle. The flexible barrier member can have an upper forward portion located at an upper forward portion of the window portion of the vehicle and closer to a front of the vehicle than a rearward portion of the flexible barrier member. The releasable buckle connector can be located at the upper forward portion of the flexible barrier member and releasably attached to the vehicle frame adjacent the front connection location between the first cage side member and the second cage side member.

Some embodiments are directed to a door barrier assembly for a vehicle that can include a first cage side member, a second cage side member, a door structure, a flexible barrier, and a releasable connector. The first cage side member can have a longitudinal axis that is inclined with respect to each of a vertical direction of the vehicle and a longitudinal direction of the vehicle. The second cage side member can have a longitudinal axis extending from a top of the first cage side structure in a longitudinal direction of the vehicle to a rear end of the second cage side structure. The door structure can extend from the first cage side member in the longitudinal direction of the vehicle. The first cage side member, the second cage side member, and a top edge of the door structure can define a window portion of the vehicle. The flexible barrier member can be located in the window portion of the vehicle. The flexible barrier member can include an upper forward portion located at an upper forward portion of the window portion of the vehicle and adjacent the top of the first cage side structure, a lower forward portion located at a lower forward portion of the window portion of the vehicle and adjacent the first cage side member and the top edge of the door structure, an upper rearward portion located at an upper rearward portion of the window portion of the vehicle and adjacent the rear end of the second cage side structure, a lower rearward portion located at a lower rearward portion of the window portion of the vehicle and adjacent a rear portion of the door structure, a releasable connector attached at the upper forward portion of the flexible barrier member, a second connector attached at the lower forward portion of the flexible barrier member, the second connector being different in structure than the releasable connector, a third connector attached at the lower rearward portion of the flexible barrier member, the third connector being different in structure than the releasable connector, and a fourth connector attached at the upper rearward portion of the flexible barrier member, the fourth connector being different in structure than the releasable connector.

Some embodiments are directed to an all-terrain vehicle that can include a roll cage, a net, and a releasable buckle assembly. The roll cage can include an upwardly extending pillar member and a longitudinally extending member connected to the pillar member to form a connection area therebetween. The net can include an upper forward portion. The releasable buckle assembly can include a first connector connected to one of the net and the connection area of the roll cage, and a second connector connected to an other one of the net and the connection are of the roll cage, and releasable engaged with the first connector such that the net is releasably attachable to the roll cage with the releasable buckle assembly at the connection area.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 5 is a partial perspective view of a releasable attachment structure of the flexible barrier assembly of FIG. 1;

FIG. 6 is a perspective view of the male attachment component of the releasable attachment structure of FIG. 5;

FIG. 7 is a perspective view of the female attachment component of the releasable attachment structure of FIG. 5;

FIG. 8 is a partial perspective view of the vehicle frame and an upper rearward frame attachment structure of the flexible barrier assembly of FIG. 1;

DETAILED DESCRIPTION OF EXEMPLARY EMBODIMENTS

Figure 1:
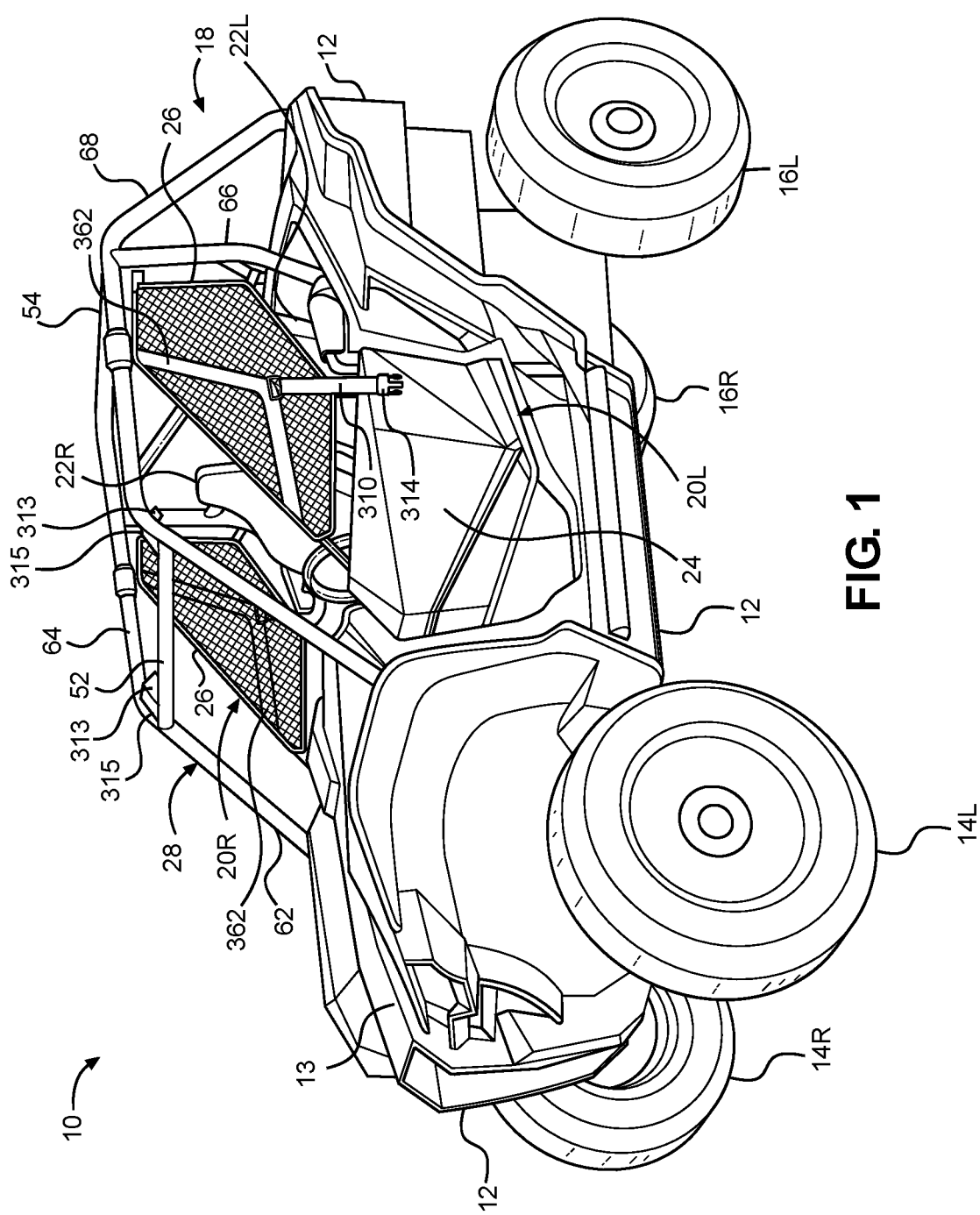
FIG. 1 is a perspective view of a vehicle made in accordance with principles of the disclosed subject matter.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Overall Vehicle

Various vehicular design factors may make it challenging to sufficiently impede or prevent deformation of the vehicle frame defining the passenger area (and window portions) upon application of significant force inputs into the frame assembly. The stiff portions of the vehicle frame that are spaced from the passenger area, such as but not limited to frame structures around the front suspension components, rear suspension components and/or powertrain components, can transmit most of or the entire load or kinetic energy input to the portion of the vehicle frame defining the passenger area. Typical vehicle frame design constraints and requirements may also limit the use of structures for managing the input load or kinetic energy. As a result, the portion of the vehicle frame defining the passenger area and window portions can be subject to deformation due to the input load or kinetic energy.

It may therefore be beneficial to provide a vehicle and a frame for the vehicle with an apparatus that addresses at least one of the above and/or other challenges of related art vehicles. In particular, it may be beneficial to provide a flexible barrier assembly that is located at window portions of the frame such that force and energy are not transmitted by or to the flexible barrier assembly during operation of the vehicle, while protection is provided to the passenger compartment from items being transmitted either into or out of the passenger compartment of the vehicle. Another benefit may be t enhance input load and energy management performance upon application of an external load, such as by controlling deformation of the vehicle frame and/or mitigating energy transmission to the passenger area caused by the input load or kinetic energy. For example, portions of the vehicle frame assembly can be configured to absorb and transfer, in a predetermined controlled manner, the load or kinetic energy that originated from the input load or kinetic energy.

In some of these and/or other embodiments, the vehicle frame can be configured to deform at portions spaced from the passenger area. In addition, the frame can be configured with structures that can resist deformation during routine off-road usage of the vehicle, but that can deform in a predetermined controlled manner in response to an input load or kinetic energy. In some of the disclosed and/or other embodiments, the vehicle frame can be configured to deform in the vicinity of the passenger area in a predetermined controlled manner so that the dimensions of the passenger area after loading can be substantially the same as the dimensions of the passenger area prior to the input load or kinetic energy.

It may therefore be beneficial to provide a vehicle with a frame assembly that addresses at least one of the above and/or other disadvantages or concerns of the related art. In particular, it may be beneficial to utilize a flexible barrier assembly located in a window portion of the vehicle frame that does not transmit force and/or kinetic energy while also providing a barrier to prevent ingress/egress of objects from/to the vehicle passenger compartment. It may also be beneficial to provide a flexible barrier assembly that is quickly and easily attachable to the vehicle frame assembly. The vehicle frame assembly can be sufficiently rigid to cope with load and/or energy inputs from the suspension as the vehicle travels over uneven terrain of an unimproved path, and that is sufficiently deformable in a predetermined controlled manner in response to load and/or energy inputs different from those input by the suspension. For example, it may be beneficial to utilize a frame assembly that includes a front frame assembly that is configured to distribute loads and/or energy input by each suspension component throughout the entire frame assembly such that the suspension load and/or energy inputs can be transferred to a main frame assembly to which the front frame assembly can be connected. Of course, it can also be beneficial to attach the disclosed flexible barrier assembly to body panel portions, door assemblies, or other vehicle structures other than the vehicle frame.

FIG. 1 is a perspective view of an exemplary vehicle 10 including frame assembly 18 in accordance with the disclosed subject matter. The vehicle 10 shown in FIG. 1 is specialized for use on an unimproved path or on an unmarked path, and can be referred to as a multipurpose utility vehicle (MUV) or as a side-by-side all-terrain vehicle (S×S, or S×S ATV).

However, the disclosed vehicle frame assembly can be used with any vehicle that is configured for travel along any one or combination of improved, unimproved, and unmarked paths. For example, embodiments are intended to include or otherwise cover any type of automobile, including a passenger car, minivan, truck, other types of all-terrain vehicle (ATV), semi-tractor, off-highway vehicle, etc.

Figure 2:
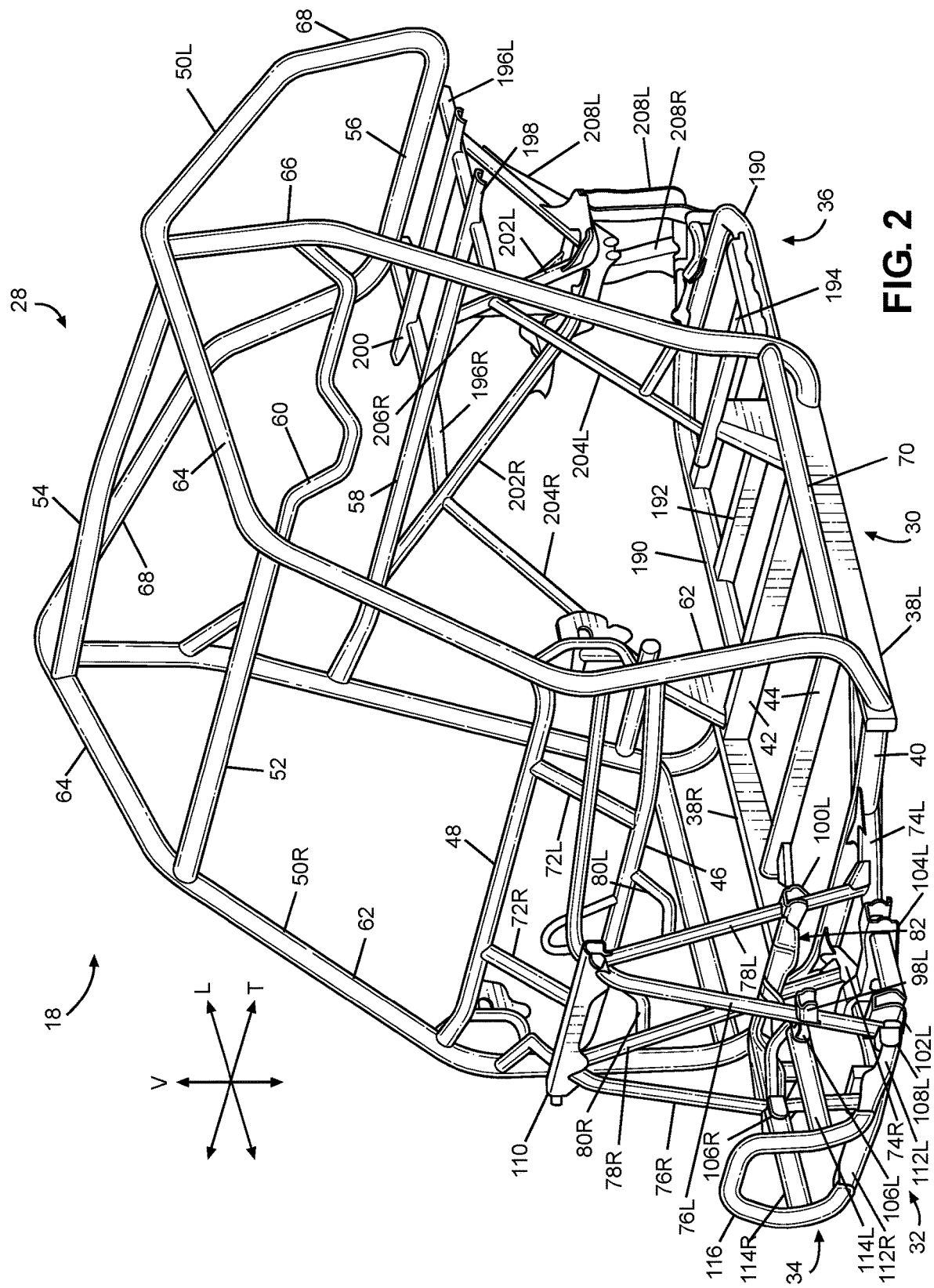
FIG. 2 is perspective view of a frame assembly of the vehicle of FIG. 1.

The vehicle 10 can include a body 12, a pair of front wheels, 14L, 14R, a pair of rear wheels 16L, 16R, a frame assembly 18, a pair of door assemblies 20L, 20R, a window panel assembly 26 located in each window, and a powertrain. The front wheels 14L, 14R can be configured as steerable wheels. Portions of the frame assembly 18 are hidden from view in FIG. 1 by the body 12 (but are shown in FIG. 2), and the powertrain is omitted from FIG. 1 for simplicity and clarity of the drawing.

The vehicle 10 can include a pair of front seats 22L, 22R mounted in a passenger area of the vehicle 10. The frame assembly 18 can include a roll cage 28 configured to extend around and above the seats 22L, 22R and the passenger area. The roll cage 28 can cooperate with the body 12 and/or at least a portion of the frame assembly 18 to define a pair of door openings through which a passenger may pass in order to enter or exit the passenger area.

Figure 3:
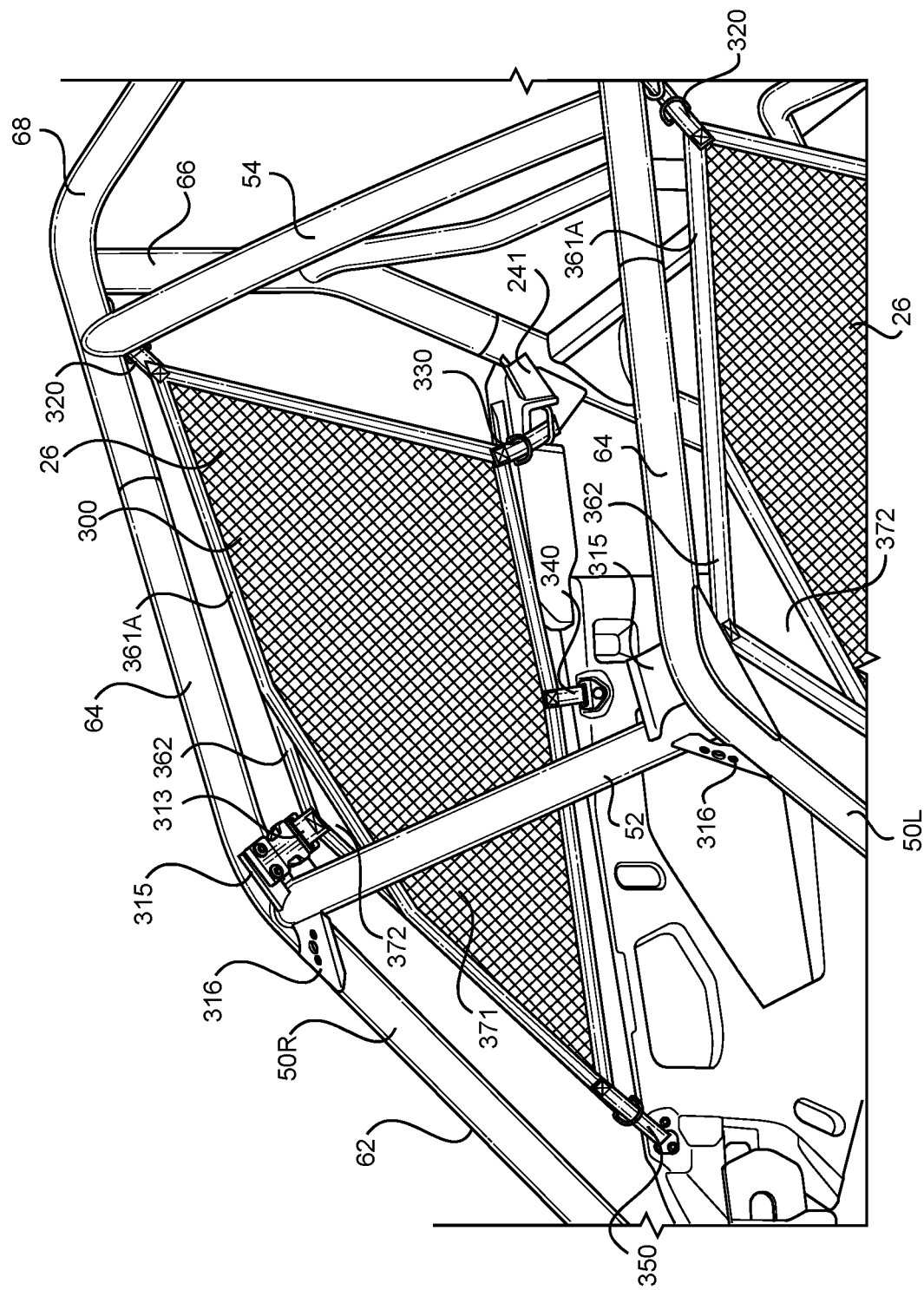
FIG. 3 is a partial perspective view of the frame assembly and flexible barrier assembly components of the vehicle of FIG. 1.
Figure 10:
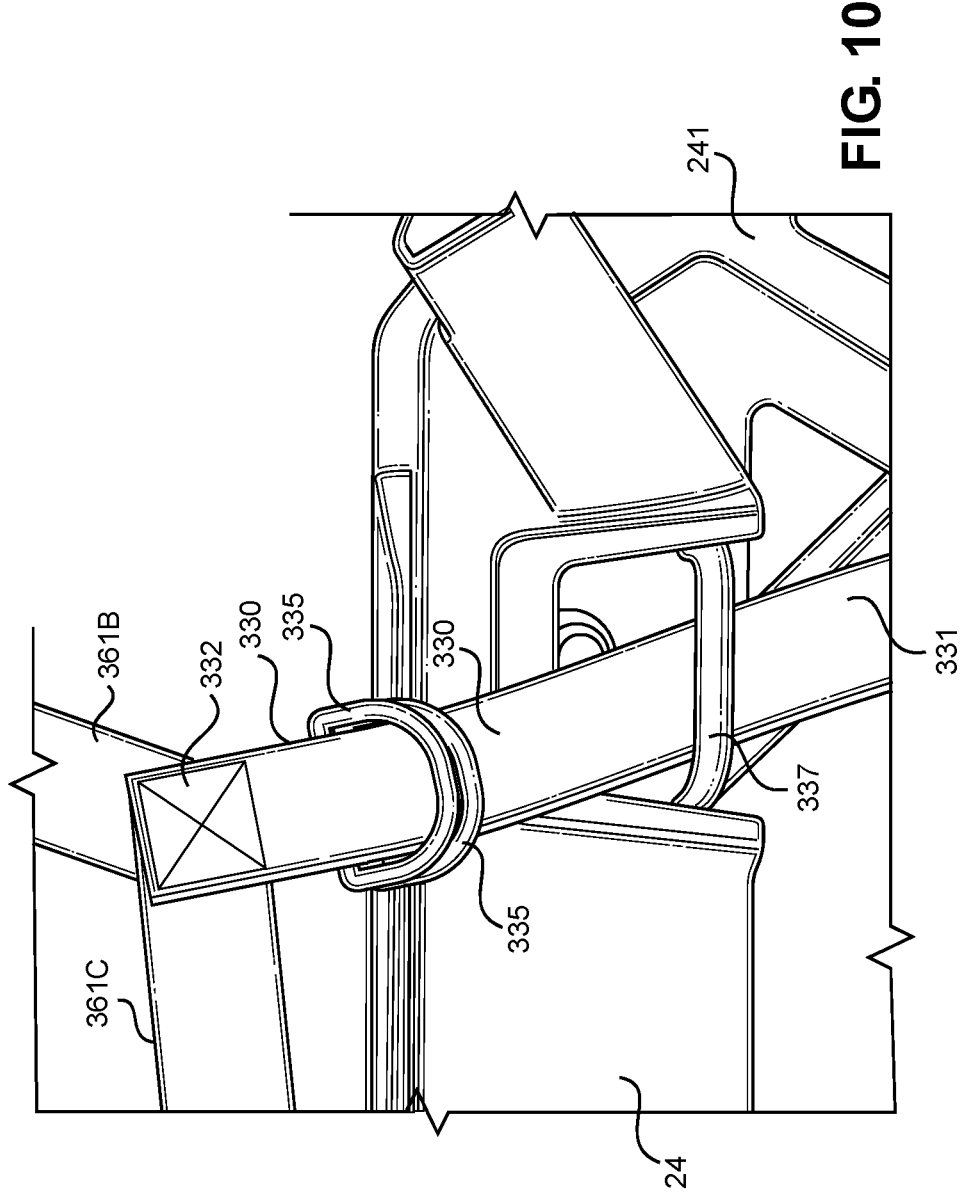
FIG. 10 is a partial side view of a rearward door attachment structure of the door barrier assembly of FIG. 1.

The door assemblies 20L, 20R, which occupy the door openings, each can include a door 24 and a window panel assembly 26, and can be configured to selectively open and close access through the door openings by moving between a closed position and a fully opened position via a hinge (generally indicated at 241 in FIGS. 3 and 10). (The door 24 of the right-side door assembly 20R is obscured from view in FIG. 1). In the closed position, the door assemblies 20L, 20R, and widow panel 26 can span the respective door openings to obstruct access to the passenger area via the door openings. In the closed position, the front portion of each door assembly 20L, 20R can be latched to the roll cage 28. The fully opened position can be any position where the door assemblies 20L, 20R are pivoted away from the respective door openings to provide substantially unobstructed access to the passenger area via the door openings. For example, the door assemblies 20L, 20R can be connected to the vehicle frame via hinge 241 located at a rearmost edge of the door 24 (but can also be hinged at a frontmost portion of the door 24). FIG. 1 shows the door assemblies 20L, 20R in the closed position.

The powertrain can include an internal combustion engine, one or more electric motor(s) or a hybrid of an internal combustion engine and one or more electric motor(s), a hydrogen engine, or other known engine/motor. The powertrain can have the engine/motor output axis oriented in the longitudinal direction L or in the traverse direction T of the vehicle 10. The powertrain can be configured to drive only the front wheels 14L, 14R, or configured to drive only the rear wheels 16L, 16R, or configured to drive all of the wheels 14L, 14R, 16L, 16R, or configured to drive the rear wheels 16L, 16R and selectively drive the front wheels 14L, 14R, or configured to drive the front wheels 14L, 14 and selectively drive the rear wheels 16L, 16R. In the exemplary embodiment of FIG. 1, the powertrain is configured as a longitudinally oriented, rear-mounted internal combustion engine that drives the rear wheels 16L, 16R and selectively drives the front wheels 14L, 14R.

II. Frame Assembly

FIG. 2 is a perspective view of the frame assembly 18. The frame assembly 18 can be configured to support the body 12, door assemblies 20L, 20R, seats 22L, 22R, suspension components for the wheels 14L, 14R, 16L, 16R, powertrain, steering system, control pedal assemblies, passengers and cargo items. The frame assembly 18 can be configured to withstand various modes of operation, including operation on unimproved paths. As will be discussed in greater detail below, the frame assembly 18 can be configured to surround the passenger area.

The frame assembly 18 can include a main frame assembly 30, a front frame assembly 32, a front bumper assembly 34 and a rear frame assembly 36. A load and energy management apparatus can distribute loads input by the front suspension on one side of the front frame assembly 32 to the other side of the front frame assembly 32. Further, the load and energy management system can distribute and attenuate loads and energy throughout the front frame assembly 32 that are applied to the front bumper assembly 34 to thereby manage the energy so that any deflection of the frame assembly 18 in the vicinity of the passenger area can be controlled in an advantageous predetermined manner.

The main frame assembly 30 can define the passenger area of the vehicle 10. The main frame assembly 30 can be configured to provide an overall bending stiffness and torsional stiffness of the vehicle 10 that can be advantageous for rugged terrain of an unimproved path.

The front frame assembly 32 can be connected to the front end of the main frame assembly 30. The front frame assembly 32 can be configured with mounting points for the front suspension components and any appropriate components/ systems, such as but not limited to portions of the body 12, a front final drive assembly, steering system components, engine cooling system, headlights, etc.

The front bumper assembly 34 can be connected to the front end of the front frame assembly 32, such that the front frame assembly 32 can be located between the front bumper assembly 34 and the main frame assembly 30. The front bumper assembly 34 can extend beyond the exterior of the body 12, or alternatively, one or more portions of the body 12 can conceal the front bumper assembly 34.

The main frame assembly 30, front frame assembly 32, front bumper assembly 34 and rear frame assembly 36 can be made from any appropriate structural element(s), such as but not limited to tubes, beams, stampings, etc., that can provide sufficient strength and rigidity for a vehicle passenger area. The frame assembly 18 can be formed from a single type of structural element, or alternatively the frame member 18 can be formed from any combination of these structural elements. The structural elements can have any appropriate cross-sectional shape, such as but not limited to circular, rectangular, regular polygonal, irregular polygonal, hollow, solid, variable along the length of the structural element, etc.

The structural elements can be formed by any appropriate process, such as but not limited to rolling, hydroforming, bending, welding, extruding, stamping, any combination of these processes, etc. Each structural element of the frame assembly 18 can be formed from any appropriate material, such as but not limited to steel, aluminum, titanium, magnesium, plastic, fiber-reinforced plastic, carbon fiber, ceramic, a composite formed from any combination of these exemplary materials, etc. Each structural element of the frame assembly 18 can be connected to each adjoining structural element in any appropriate manner, such as but not limited to mechanical fasteners, welding, adhesive, any combination thereof, etc.

A. Main Frame Assembly

The main frame assembly 30 can define the passenger area and can include the roll cage 28, a pair of longitudinal members 38L, 38R and a plurality of lower cross members 40, 42, 44, a pair of upper cross members 46, 48 and a pair of support members 72L, 72R.

The longitudinal members 38L, 38R can extend in the longitudinal direction L of the vehicle 10, from the front of the passenger area to the rear of the passenger area. The longitudinal members 38L, 38R can each be configured as a substantially straight, hollow beam having a substantially rectangular cross-sectional shape.

The first through third lower cross members 40, 42, 44 can extend in the transverse direction T of the vehicle 10, from the left longitudinal member 38L to the right longitudinal member 38R. The first lower cross member 40 can be slightly bent along the longitudinal direction L near each end toward the rear of the vehicle 10. The first lower cross member 40 can be a hollow tube having a substantially circular cross-sectional shape. The second and third lower cross members 42, 44 can be configured as a substantially straight, hollow beam having a substantially rectangular cross-sectional shape.

The first lower cross member 40 can be connected to each of the longitudinal members 38L, 38R adjacent a respective front end of the longitudinal members 38L, 38R. The second lower cross member 42 can be connected to each of the longitudinal members 38L, 38R adjacent a respective rear end of the longitudinal members 38L, 38R. The third lower cross member 44 can be connected to each of the longitudinal members 38L, 38R at a portion of the longitudinal members 38L, 38R intermediate the front and rear ends of the respective longitudinal members 38L, 38R. In the exemplary embodiment of FIG. 2, welds can connect the lower cross members 40, 42, 44 to the longitudinal members 38L, 38R.

The first and second upper cross members 46, 48 can extend in the transverse direction T of the vehicle 10 from the left cage side assembly 50L to the right cage side assembly 50R. The first upper cross member 46 can be spaced away from the second upper cross member 48. The second upper cross member 48 can be connected to the cage side assemblies 50L, 50R at a position that is higher in the vertical direction V of the vehicle 10 than the position at which the first upper cross member 46 is connected to the side assemblies 50L, 50R.

The support members 72L, 72R can extend generally in the vertical direction V of the vehicle 10 from the first upper cross member 46 to the second upper cross member 48. The support members 72L, 72R can be spaced apart from each other in the transverse direction T of the vehicle 10. The support members 72L, 72R can each be configured as a hollow tube having a substantially circular cross-sectional shape. In the exemplary embodiment of FIG. 2, welds can connect the support members 72L, 72R to the upper cross members 46, 48.

The upper cross members 46, 48 and the support members 72L, 72R can be configured to support and secure a panel assembly (such as but not limited to an instrument panel assembly), a steering assembly, and/or a portion of the body 12 (such as but not limited to a hood panel 13—see FIG. 1).

The roll cage 28 can include a pair of cage side assemblies 50L, 50R, a plurality of cage cross members 52, 54, 56, 58, 60. The roll cage 28 generally defines the passenger compartment.

The cage side assemblies 50L, 50R can extend in the longitudinal direction L of the vehicle 10, from the front end of the passenger area to the rear end of the passenger area. The cage side assemblies 50L, 50R can define the limits of the passenger area in the transverse direction T of the vehicle 10, the longitudinal direction L of the vehicle 10 and in the vertical direction V of the vehicle 10. The cage side assemblies 50L, 50R can be configured to support the door assemblies 20L, 20R and any appropriate portion(s) of the body 12, such as but not limited to flexible side panel(s) (transparent, opaque, or a combination thereof), rigid side panel(s), roof panel (rigid or flexible), flexible or rigid rear panel (transparent, opaque, or a combination thereof), etc. The cage side assemblies 50L, 50R can be configured to resist, impede, or minimize deformation that could be caused by a load or kinetic energy input into either or both of the cage side assemblies.

Each of the cage side assemblies 50L, 50R can be formed from any appropriate number of structural elements, from one to any number greater than one. The side cage assemblies 50L, 50R can be configured with any shape and contour that can be advantageous to meet the structural performance and aesthetic appeal desired for the vehicle 10. The following description will be directed toward the left cage side assembly 50L with the understanding that the right cage side assembly 50R can be a mirror image of the left cage side assembly 50L.

The left cage side assembly 50L can include a plurality of cage side members 62, 64, 66, 68, 70. Each of the first through fifth cage side members 62, 64, 66, 68, 70 can be configured as a hollow tube having a substantially circular cross-section shape. The cage side members 62, 64, 66, 68, 70 can be configured with any appropriate elongated shape that can provide the desired dimensionality of the passenger area and advantageously conform to the aesthetic appearance desired for the vehicle 10.

The first cage side member 62 can be referred to as an A-pillar. The first cage side member 62 can be connected at one end to the left longitudinal member 38L adjacent the front end of the left longitudinal member 38L. The first cage side member 62 can be connected to a side of the left longitudinal member 38L that can be opposite to the side to which the first cross member 40 is connected. The one end of the first cage side member 62 can be aligned in the transverse direction T with the end of the first cross member 40 that is connected to the left longitudinal member 38L.

Each of the upper cross members 46, 48 can be connected to a middle portion of the first cage side member 62 of each of the cage side assemblies 50L, 50R.

The third cage side member 66 can be referred to as a B-pillar. The third cage side member 66 can be connected at one end to the left longitudinal member 38L adjacent the rear end of the left longitudinal member 38L. The third cage side member 66 can be connected to a side of the left longitudinal member 38L that can be opposite to the side to which the second lower cross member 42 is connected. The one end of the third cage side member 66 can be aligned in the transverse direction T with the end of the second cross member 42 that is connected to the left longitudinal member 38L.

The first through fifth cage cross members 52, 54, 56, 58, 60 can extend in the transverse direction T of the vehicle 10 from the left side assembly 50L to the right side assembly 50R. The cage cross members 52, 54, 56, 58, 60 can be connected to each of the side assemblies 50L, 50R at respective locations spaced apart along the longitudinal direction L of the vehicle 10. The cage cross members 52, 54, 56, 58, 60 can be configured to maintain a predetermined spacing between the left cage side assembly 50L and the right cage side assembly 50R in the transverse direction T. The cage cross members 52, 54, 56, 58, 60 can define the limits of the passenger area in the longitudinal direction L of the vehicle 10 and the vertical direction V of the vehicle 10. The cage cross members 52, 54, 56, 58, 60 can be configured to manage load and/or energy inputs so that deflection of the frame assembly 18 in the vicinity of the passenger area can be controlled in an advantageous predetermined manner. In the exemplary embodiment of FIG. 2, the cage cross members 52, 54, 56, 58, 60 can be connected to the cage side assemblies 50L, 50R by welding.

B. Front Frame Assembly

Referring to FIG. 2, the front frame assembly 32 can be connected to the first lower cross member 40 and each of the first cage side members 62 of the main frame assembly 30. The front frame assembly 32 can include the front bumper assembly 34, a pair of front lower members 74L, 74R, a pair of first front members 76L, 76R, a pair of second front members 78L, 78R, a pair of intermediate members 80L, 80R and a transverse frame assembly 82.

The front frame members 76L, 76R, 78L, 78R can be spaced apart from each other in the transverse direction T of the vehicle 10 by a predetermined distance sufficient to accommodate any component(s) and/or system(s) to be supported by the front frame assembly 32. For example, the front frame assembly 32 can be configured to support a front suspension and wheel assembly, a radiator, a steering rack assembly, and/or a front final drive assembly.

The front frame assembly 32 can include a plurality of mounting brackets 98L, 102L, 104L 106L, 106R, 108L that can connect the front suspension and wheel assembly, the radiator, and the front bumper assembly 34 to the front frame assembly 32. The front suspension and wheel assembly can be movably connected to each of the suspension brackets 98L, 100L, 102L, 104L, so that the suspension members can pivot relative to the suspension brackets 98L, 102L, 104L, and the front wheels 14L, 14R can move generally in the vertical direction V of the vehicle 10 as the vehicles travels along an improved or unimproved pathway. (The suspension brackets on the right side of the frame assembly that correspond to each of left-side brackets 98L, 102L, 104L and 108L are either obstructed from view or are not labeled for clarity of the drawing). The front bumper assembly 34 can be connected to each of the bumper brackets 106L, 106R, 108L. The following description will be directed toward the brackets 98L, 102L, 104L, 106L, and 108L mounted on left side of front frame assembly 32 with the understanding that the brackets mounted on the right side of the front frame assembly 32 can be a mirror image of the brackets 98L, 102L, 104L, 106L, 108L left side of the front frame assembly 32, and can be connected to the right side of the front frame assembly 32 in a similar manner.

Referring to FIG. 2, the left side of the front frame assembly 32 can include a pair of upper suspension brackets 98L, 100L, a pair of lower suspension brackets 102L, 104L.

The front frame assembly 32 can include an upper bracket 110. The upper bracket 110 can be connected to and extend from each of the first frame members 76L, 76R. The upper bracket 110 can extend in the transverse direction T of the vehicle 10 to span from the left first frame member 76L to the right first frame member 76L.

Each of the front lower frame members 74L, 74R, the first front frame members 76L, 76R, the second front frame members 78L, 78R are configured as hollow metal tubes having a substantially circular cross-section. However, any combination of the front lower frame members 74L, 74R, the first front frame members 76L, 76R and the second front frame members 78L, 78R can be have a cross-sectional shape that is different from a substantially circular cross-sectional shape. Further, any combination of the front lower frame members 74L, 74R, the first front frame members 76L, 76R and the second front frame members 78L, 78R can be formed of a material other than metal, such as but not limited to carbon fiber, plastic, carbon fiber reinforced plastic, ceramic, pulp, or glass fiber reinforced plastic.

Further, the front lower frame members 74L, 74R, the first front frame members 76L, 76R, the second front frame members 78L, 78R can be welded to each other to form the structure described above. However, embodiments are intended to include or otherwise cover any combination of the front lower frame members 74L, 74R, the first front frame members 76L, 76R and the second front frame members 78L, 78R connected by threaded fasteners, adhesives, a combination of brackets and threaded fasteners, rivets, or other known connective structures, materials, or methods.

The front frame assembly 32 can include a pair of upper bumper brackets 106L, 106R and a pair of lower bumper brackets 108L. (The lower bumper bracket 108R is obstructed from view in FIG. 2).

C. Front Bumper Assembly

The front frame assembly 32 can include the front bumper assembly 34. Referring to FIG. 2, the front bumper assembly 34 can be connected to the front side of the first frame members 76L, 76R by connector members 112L, 112R, 114L, 114R and bumper brackets 106L, 106R, 108L, such that the first and second frame members 76L, 76R, 78L, 78R are located between or intermediate the front bumper assembly 34 and the main frame assembly 30.

Lower connector members 112L, 112R can be connected to the respective one of the bumper brackets 108L such that the lower connector members 112L, 112R can pivot with respect to the lower bumper brackets 108L. The second end of the lower connector members 112L, 112R can be connected to the bumper member 116.

D. Transverse Frame Assembly

The transverse frame assembly 82 can extend in the longitudinal direction L, the transverse direction T and the vertical direction V. Referring to FIG. 2, the transverse frame assembly 82 can be connected to and extend from each of the first and second frame members 76L, 76R, 78L, 78R. The transverse frame assembly 82 can be configured to cooperate with the front final drive assembly to transfer load or kinetic energy inputs from the front suspension and wheel assembly into each of the front lower frame members 74L, 74R, which in turn, can be configured to transfer the load or kinetic energy input into the first lower cross member 40 of the main frame assembly 30.

E. Rear Frame Assembly

Referring to FIG. 2, the rear frame assembly 36 can include a plurality of rear frame members 190, 192, 194, 196L, 196R, 198, 200, 202L, 202R, 204L, 204R, 206L, 206R, 208L. The rear frame members 190, 192, 194, 196L, 196R, 198, 200, 202L, 202R, 204L, 204R, 206L, 206R, 208L can be configured to define a lower cradle assembly, an upper bed support assembly, and a suspension support assembly. The lower cradle assembly can be configured to mount and support the power source and a portion of the rear suspension and wheel assembly in any appropriate manner. The upper bed support can be configured to support a storage area of the vehicle 10. The suspension support assembly can be configured to support another portion of the rear suspension and wheel assembly.

III. Front and Rear Suspension and Wheel Assemblies

The vehicle 10 can include a front suspension and wheel assembly and a rear suspension and wheel assembly. As discussed above, the front suspension and wheel assembly can be connected to the front frame assembly 32. At least a portion of the rear suspension and wheel assembly can be mounted to the rear frame assembly 36.

IV. Window and Door Assemblies

Figure 4:
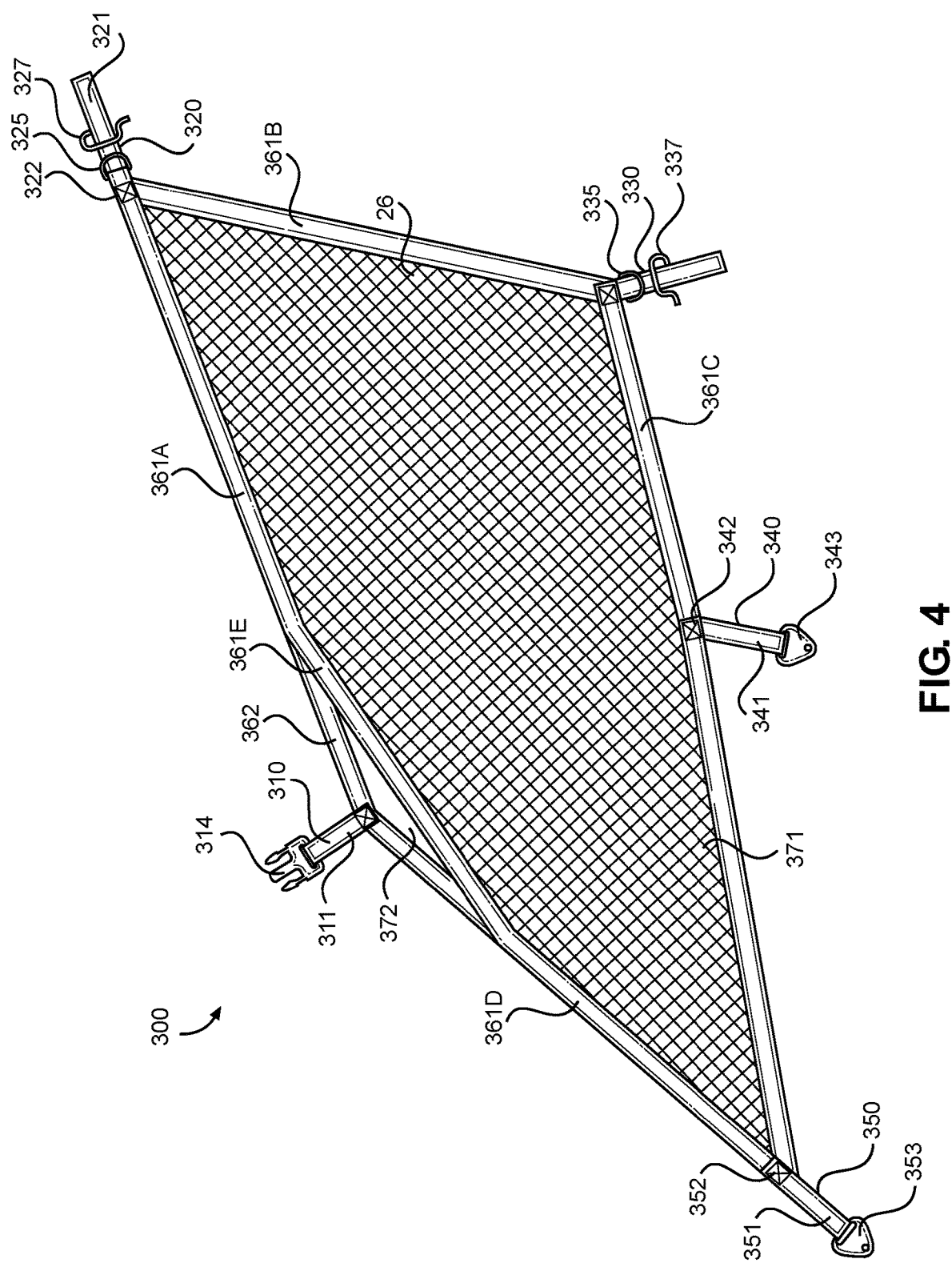
FIG. 4 is a side view of the flexible barrier assembly of FIG. 1.

FIGS. 3 and 4 are a partial perspective view of the vehicle frame assembly 18 and flexible barrier assembly 300 components of the vehicle of FIG. 1, and a side view of the flexible barrier assembly of FIG. 1, respectively. The flexible barrier assembly 300 can include an upper forward portion that includes an opening 372 and a connector 310 that connects to a bracket attachment 315 to the first cage cross member 52 such that the upper forward portion of the window panel 26 is located adjacent the top of the first cage side member 62, the front end of the second cage side member 64, and first cage cross member 52. A lower forward portion of the flexible barrier assembly 300 is located at a lower forward portion of the window portion of the vehicle and adjacent the bottom of the first cage side structure 62. The lower forward portion of the panel 26 can be connected to the door 24 by a permanent connector 350. An upper rearward portion of the flexible barrier assembly 300 can be located at an upper rearward portion of the window portion of the vehicle and adjacent the rear end of the second cage side member 64, and adjacent an intersection between the second cage side member 64 and second cage cross member 54. An adjustable connector 320 can connect the panel 26 to the vehicle frame 18 (specifically, to the second cage cross member 54, but possibly to the second cage side member 64 and/or third cage side member 66). The window panel 26 can include a lower rearward portion located at a lower rearward portion of the window portion of the vehicle and adjacent an upper rear portion the door 24. An adjustable connector 330 can adjustably connect the window panel 26 to the door at this location. The flexible barrier assembly 300 can also include another permanent connector 340 located along a middle of a bottom edge of the window panel 26 and connected to a mid point of a top edge of the door 24.

The bracket attachment 315 for the upper forward releasable connector 310 can be directly attached to the first cage cross member 52 at a rearward face of the cross member 52 via weld, fastener structures, or other known attachment structure or method. A support bracket 316 can be similarly attached to a front face of the first cage cross member 52 and span over to and attach to the first cage side member 62 to provide support at the junction between the first cage cross member 52 and the first cage side member 62.

As shown in FIG. 4, the window panel 26 can include a net or webbed portion 371 that is bordered by a plurality of strap portions. The strap portions can include an upper edge strap 361a, a rear edge strap 362b, a lower edge strap 361c, a front edge strap 361d, and a corner/angled strap 361e. A second strap 362 can be located adjacent the corner/angled strap 361e to form an opening therebetween. A connector 310 can be connected to an apex of the corner/angled strap 362. In FIG. 4, the opening 372 is shaped as a triangle, with the corner/angled strap 362 forming one side of the triangle and the second strap 362 forming the two remaining sides of the triangle opening 372. The triangle opening 372 is shown as an isosceles shaped triangle opening, but can be differently shaped and remain within the scope of the presently disclosed subject matter. The opening 372 allows the connector 310 to move relative to the net or web 371 in a spring like fashion such that the connector 310 can be easily and releasably attached to the vehicle frame 18 or other structure of the vehicle while tensioning the entire panel 26 such that the window panel 26 assumes a flat orientation in the window of the vehicle when attached. The opening 372 also provides a type of handle for easy manipulation of the panel 26 into place during the vehicle door opening and closing operations.

FIGS. 5-7 depict an example of the releasable attachment connector 310 of the flexible barrier assembly of FIG. 1. The connector 310 can be formed as a buckle that includes a male connector 314 connected to the second strap 362 by a connector strap 311 that is sewn onto the second strap and then looped through opening 314c of the male connector 314 and sewn into place. The male connector 314 further includes lateral spring arms 314a each designed to align with a female connector portion and lock into grooves in the female connector portion. The male connector 314 further includes a central arm 314b located between the spring arms 314a that provides a centering function such that the male connector 314 aligns correctly within alignment posts of the female connector 313.

The female connector 313 can be attached to the first cage cross member 52 by bracket 315 that is angled with respect to each of the first cage cross member 52, first cage side member 62 and second cage side member 64 such that the bracket 315 (and female connector 313) extends in an angular orientation toward the window opening of the vehicle. The female connector 313 can be connected to the first cage cross member 52 by a pair of fasteners 313a that also serve as guide posts for the central arm 314b of the male connector 314. The female connector 313 can include a central opening 313c into which the male connector spring arms 314a and central prong 314b are inserted. Two spring lock indents 313b can be located on opposing lateral sides of the female connector 313. When connected, the male spring arms 314a will extend/spring out of the spring lock indents 313b of the female connector 313 to lock the male connector 314 into the female connector 313.

Figure 9:
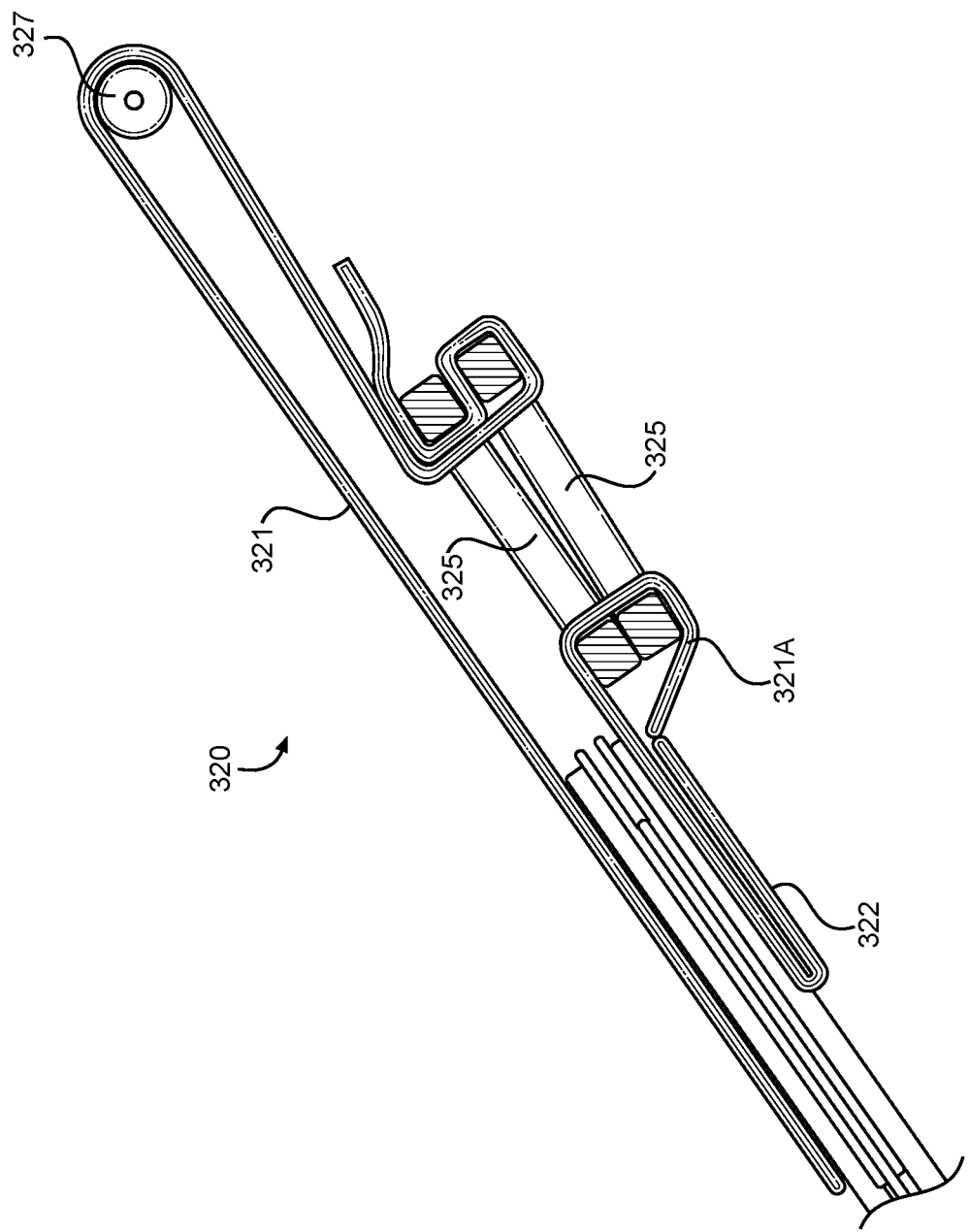
FIG. 9 is a top partial view of attachment structure for the flexible barrier assembly of FIG. 8.

FIG. 8 is a partial perspective view of the vehicle frame and the upper rearward frame attachment structure of the flexible barrier assembly of FIG. 1. The drawing depicts the flexible barrier assembly 300 in a partially connected state. In particular, connector strap 321 is shown extending up and out of mounting loop 327. When actually connected (see FIG. 9), the strap 321 will loop over the mounting loop 327 (out of the drawing in FIG. 8), and then be directed downward though both of D-rings 325, and then looped back outward and upward and through only the uppermost/innermost D-ring 325 to provide a cinching type adjustable connection point for the flexible barrier assembly 300 at the location of the mounting loop 327. In this embodiment, the mounting loop 327 is attached directly to the second cage side member 64 adjacent the intersection of both the second cage cross member 54 and the third cage side member 66 located at a rear of the passenger compartment of the vehicle. It is contemplated that the adjustable connector 320 can be "tuned" to provide a flat orientation for the panel 26 within the vehicle window and then, after tuning, the flexible barrier assembly 300 can be operated such that the door 24 of the vehicle can be opened and closed by use of only the releasable connector 310. The adjustable connector 320 can include a D-ring strap 321a that holds two D-rings 325 in place along strap 321 and is attached by a sewn stitch connection 322 to the panel 26 at a juncture between upper edge strap 361a and rear edge strap 361b. In order to adjust or tune the connector 320, an end of the strap 321 can be pulled along its longitudinal axis to tighten the connection, or pushed back through the D-rings 325 to loosen the connection.

FIG. 10 is a partial perspective view of the rearward door adjustable connector structure 330. The figure depicts a semi-connection state in which connector strap 331 extends through mounting loop 337 located at a rear of the door 24. When actually connected, the strap 331 will loop over the mounting loop 327 (out of the drawing in FIG. 10), and then be directed upward though both of D-rings 335, and then looped back outward, downward and through only the lowermost D-ring 325 to provide a cinching type adjustable connection point for the flexible barrier assembly 300 at the location of the mounting loop 337. In this embodiment, the mounting loop 337 is directly connected to the door 24 of the vehicle. The strap 331 can be attached to the panel 26 by a stitch connection 332 and oriented such that a longitudinal axis of strap 331 is directed vertically, downward away from panel 26. The stitch connection 332 can connect the strap 331 to a junction between the rear edge strap 361b and lower edge strap 361c. It should be noted that the adjustable connectors 320 and 330 are both located at a rearmost portion of the door 24. The door 24 in this embodiment is swingable about a hinge 241 also located at a rear of the door 24. Thus, the connectors 320 and 330 need not be adjusted in order to open the door 24 because the connectors 320, 330 are in substantial alignment with the opening/closing rotational axis for the door 24. In fact, the connectors 320, 330 can be configured to act as a hinge for the window panel 26 when the door 24 is opened or closed.

Figure 11:
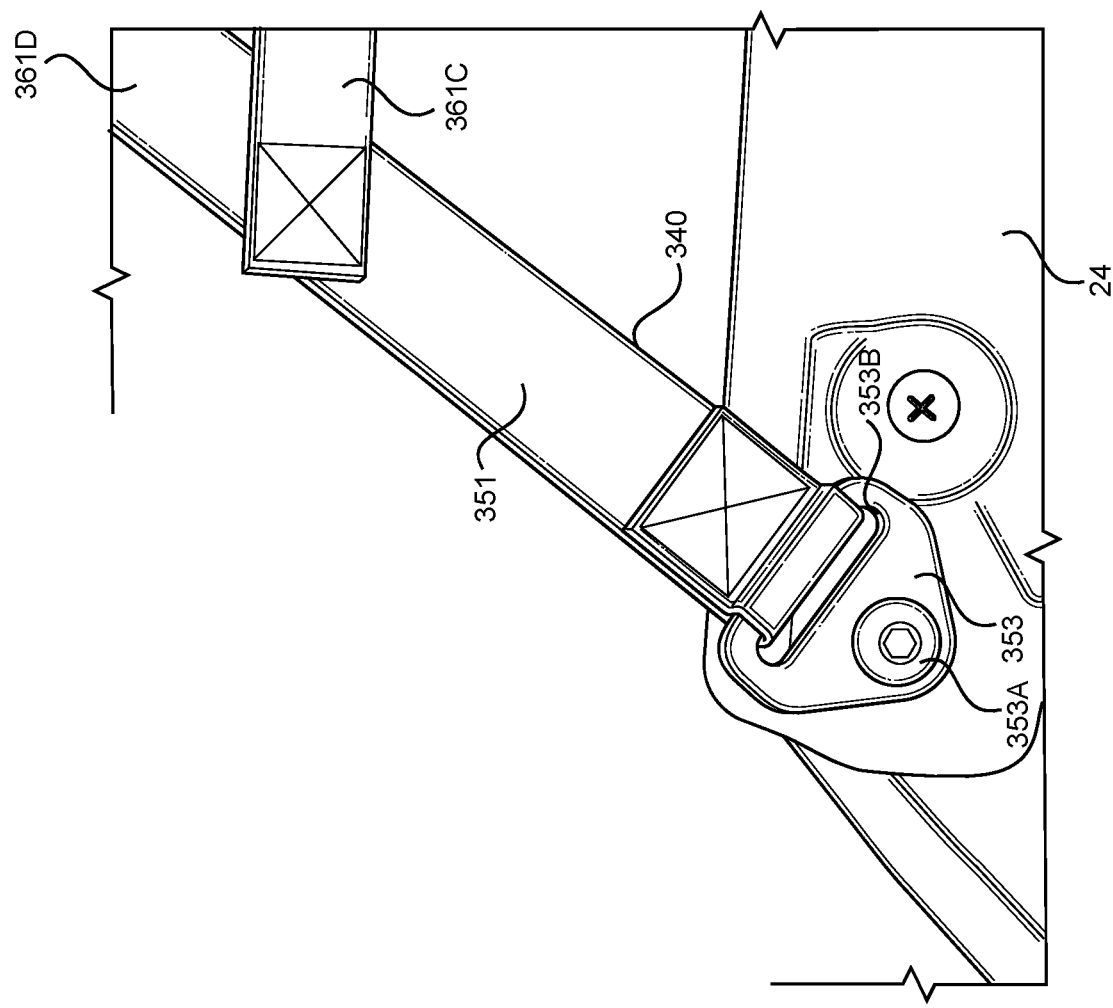
FIG. 11 is a partial side view of a lower frontward door attachment structure of the flexible barrier assembly of FIG. 1.
Figure 12:
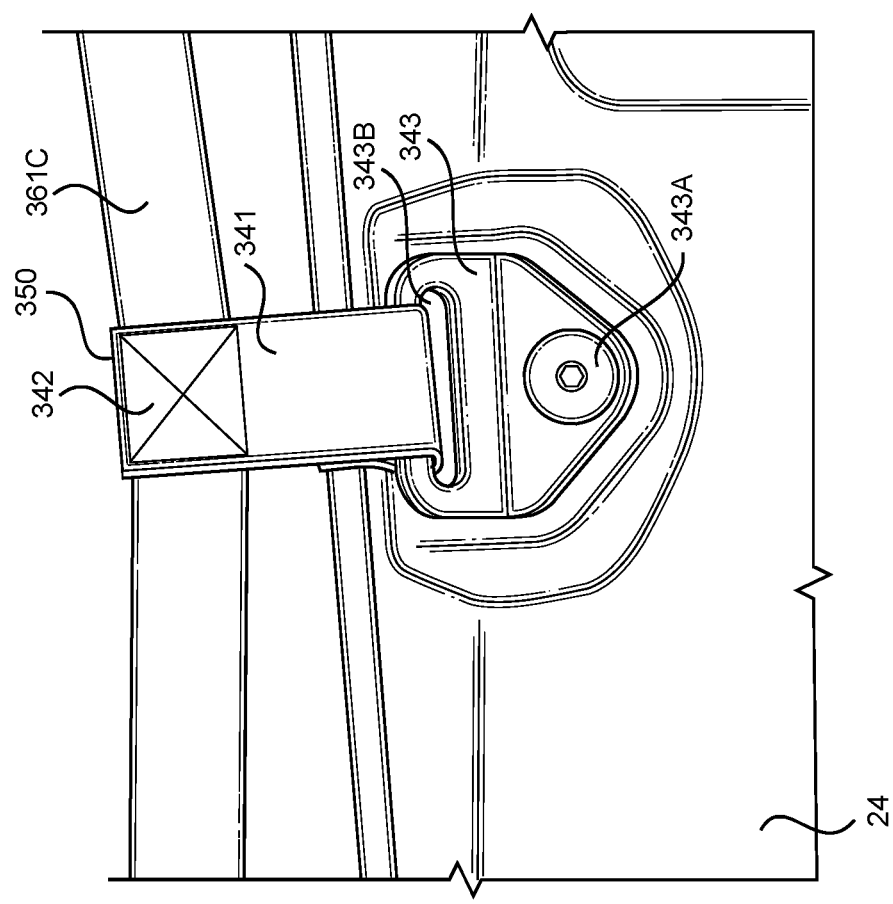
FIG. 12 is a partial side view of a lower central door attachment structure of the flexible barrier assembly of FIG. 1.

FIGS. 11 and 12 are partial perspective views of lower frontward and the lower central door attachment structures for the flexible barrier assembly 300. Each of the connectors 340, 350 can be considered permanent connection structures because they cannot be disconnected without the assistance of a tool, or because any attempt to remove the connectors from the door could damage the connectors 340, 350 and/or the door 24. The location and tension placed upon the window panel 26 is predetermined by each of the connector structures 340, 350 and is not adjustable without a tool or without inelastic deformation of any of the structures that make up the connector structures 340, 350. Connector 340 can include a bracket 343 that includes an opening 343b and a fastener 343a for direct connection to the door 24. A connector strap 341 can be looped through the opening 343b and ultimately connected to the lower edge strap 361c of the window panel 26 via stitch connection 342. The connector strap 341 can have a longitudinal axis extending in a substantially vertical direction of the vehicle and substantially perpendicular with respect to the longitudinal axis of the lower edge strap 361c.

Similarly, connector 350 can include a bracket 353 that includes an opening 353b and a fastener 353a for direct connection to the door 24. A connector strap 351 can be looped through the opening 343b and ultimately connected to the lower edge strap 361c and front edge strap 361d of the window panel 26 via stitch connection 352. The connector strap 351 can have a longitudinal axis extending upwardly and rearwardly at an angle with respect to the vertical direction of the vehicle. For example, the strap 351 can extend rearward at an acute angle with respect to the top edge of the door 24. The longitudinal axis of the connector strap 351 can be collinear with a longitudinal axis of the front edge strap 361d. Further, the connector strap 351 and front edge strap 361d can be a single unitary strap that extends from the connector bracket 353 to connector 310 or to opening 372 or other location.

In operation, an occupant of the vehicle reaches up to the front upper corner of the passenger cabin with a single hand to release the connector 310 by squeezing each of the spring arms 314a toward a center of the buckle, thus releasing the male connector portion 314 from the female connector portion 313. A spring force of the second strap 362 (and/or gravity) causes female connector 313 to positively or springingly disengage from the male connector 314 and also causes the front top edge of the window panel 26 (and second strap 362 and connector 310) to drop down over a remainder of the window panel 26. In this configuration, the door 24 can now be opened (when connector 310 is in a locked state, the window panel 26 connection prevents the door from opening). When connector 310 is in an unlocked (or disengaged) state, the door 24 can fully rotate about hinge 241 such that front edge of the door 24 moves away from the vehicle frame and rotates outward and rearward with respect to the vehicle 10. The connectors 320, 330, 340, and 350 need not be adjusted or disengaged in order for the door 24 to rotate from the fully closed position to the fully opened position. The connectors 320, 330 are substantially aligned on the rotational axis of door hinge 241 to allow for rotation even though they connect the window panel 26 to the frame 18 of the vehicle. Connectors 340, 350 are connected to the door 24 and therefore would not hinder rotation of the door 24 away from the vehicle frame 18.

Similarly, in order to close the door 24 relative to the vehicle frame and secure the window panel 26 back into place in the window opening of the frame 18, an operator first closes the door 24. The operator can then secure the window panel 26 into place by placing the second strap 362 into the palm of the operator's hand and extending the second strap 362 and male connector portion 314 upward until the male connector 314 engages and locks with the female connector 313. A spring force emanating primarily from the strap 362 will counter the upward motion imparted by the operator. The spring force flattens the window panel 26 into a correct location and position within the vehicle window. The amount of spring force is optimized at the exact point where the connector 310 is fully connected. Tuning of the location and position of the window panel 26 can be achieved (but not necessarily each time the door is closed) using one or both of the adjustable connectors 320, 330.

V. Alternative Embodiments

While certain embodiments of the invention are described above, and FIGS. 1-12 disclose a best mode for practicing the various inventive aspects, it should be understood that the invention can be embodied and configured in many different ways without departing from the spirit and scope of the invention.

For example, embodiments are disclosed above in the context of a vehicle 10 shown in FIG. 1. However, embodiments are intended to include or otherwise cover any type of vehicle disclosed above. For example, exemplary embodiments are intended to include or otherwise cover any type of vehicle that can travel on an improved surface such as but not limited to a paved road.

Exemplary embodiments are intended to include or otherwise cover any type of front frame assembly 32 or rear frame assembly 36. In other words, exemplary embodiments are intended to cover any application of front frame or rear frame assembly that can sustain load or kinetic energy inputs from a front suspension and wheel assembly while also being capable of responding in a predetermined and controlled manner to a load or kinetic energy input in the longitudinal direction of the vehicle 10. For example, one or both of the first and second frame members can be made from a plurality of parts or made as a unitary homogenous component.

Exemplary embodiments are intended to include any appropriate shape for each of the various frame members. Further, exemplary embodiments are intended to include the frame members divided differently as compared to the cage and side frame members described above. For example, exemplary embodiments are intended to include or otherwise cover a unitary frame members or frame members that are segmented and include a plurality of sub-frame elements that are welded or otherwise attached to make a frame member.

The window panel is disclosed as including a web or net structure that extends uniformly throughout the main opening defined by the straps 361a-e. However, it is contemplated that the web or net structure can be non-uniform and made from other non-net materials either opaque or see-through. For example, an insignia or decal can be placed at a central portion of the web or net 371. Alternatively, a plastic window or deflection surface can be incorporated into the web or net at strategic locations in the web or net 371 for particular applications of the vehicle.

The straps 361*a-e* can all be made from single uniform pieces of material or segmented at various locations and stitched, welded or fastened together in various manners to create a window panel 26 that is configured in accordance with design or utility parameters. Further, the straps 361*a-e* can be made from various materials including cloth, plastic, composite structure such as but not limited to a metal, wood, or ceramic reinforcement member encased within in a plastic member, etc. The width and shape of the straps can be altered for particular applications of the vehicle.

The attachment locations for the flexible barrier member 300 can be configured differently and remain within the scope of the presently disclosed subject matter. For example, the bracket 315 for attaching the upper frontward portion of the passenger window panel 26 can be attached to any one or multiple of the first cage side member 62, second side cage member 64 or first cage cross member 52. The upper rearward adjustable connector 320 can be connected to a connector 321 that is attached to any of the rear portion of the second cage side member 64, the second cage cross member 54 or the top portion of the third cage side member 68. In addition, the juncture between the second cage side member 64, the second cage cross member 54 and the top portion of the third cage side member 68 can be differently configured. Each of the members 54, 64, 68 can be attached or welded together at a single juncture, or the juncture between the rear and top of members 64, 68 can be located in front of or behind (or exactly at) the location of the lateral end of the second cage cross member 54 (where the member 54 is attached to one or both of members 64, 68). Depending on the attachment configuration of the vehicle frame, the location of connector 320 can be selected for aesthetic or utilitarian purposes.

The opening 372 is shown as triangular in shape, but can be various other shapes I accordance with the scope of the presently disclosed subject matter. In addition, the opening 372 can include web or netting. In fact, the window panel 26 can be configured without an opening 372 if desired. Alternatively, multiple openings 372 can be provided at various locations in the window panel 26.

The adjustable connectors 320 and 330 are shown using a D-ring structure. However, it is contemplated that other connector structures can be used at these locations, including permanent connectors similar to connectors 340, 350. Alternatively, hook and loop material could be used to provide the cinching type adjustable connector. In addition, various other adjustable connector structures could be used at any of the connection locations, including ratcheting connectors, friction lock, sailing block and tackle mechanisms, etc.

The releasable connector 310 is shown as a female connector 313 attached to the upper edge 361*a* of the first strap and a male connector 314 mounted to the frame assembly 18 via the bracket attachment 315. However, these parts of the releasable connector can be switched such that the male connector 314 is connected to the upper edge 361 of the first strap and the female connector 313 is mounted to the frame assembly 18 via the bracket attachment 315.

The releasable connector 310 is shown as a buckle mechanism. However, other quick release connectors can be used at this location. For example, snaps, hook and loop fasteners, ratcheting connectors, friction lock connectors, sailing block and tackle mechanisms, etc. can be used provided the connectors are relatively easy and quick to operate and release. The female and male portions of the connector can also be interchangeably placed with respect to each other.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A door barrier assembly for a vehicle, comprising:
   a vehicle frame that includes a first cage side member having a longitudinal axis extending in a vertical rearward direction of the vehicle and a second cage side member having a longitudinal axis extending in a longitudinal direction of the vehicle, the first cage side member is connected at a front connection location to the second cage side member and the second cage side member extends in a longitudinal rearward direction of the vehicle from a top end of the first cage side member, the first cage side member and second cage side member define a window portion of the vehicle;
   a flexible barrier member located in the window portion of the vehicle, the flexible barrier member has an upper forward portion located at an upper forward portion of the window portion of the vehicle and closer to a front of the vehicle than a rearward portion of the flexible barrier member;
   a releasable buckle connector located at the upper forward portion of the flexible barrier member and releasably attached to the vehicle frame adjacent the front connection location between the first cage side member and the second cage side member; and
   a first cage cross member extending in a transverse direction across the vehicle and attached at a first end to at least one of the first cage side member and second cage side member at the front connection location, and the releasable buckle connector includes a first buckle portion connected directly to the first cage cross member via the buckle connector structure.

2. The door barrier assembly for a vehicle according to claim 1, further comprising:
   a door structure having a top edge extending in the longitudinal direction of the vehicle and further defining the window portion, wherein a lower edge of the flexible barrier member is attached to the top edge of the door structure at a frontward location of the door structure and at a rearward location of the door structure.

3. The door barrier assembly for a vehicle according to claim 2, wherein the vehicle has a front end and a rear end, and the door structure has a frontmost portion and a rearmost portion, and the rearmost portion is located closer to the rear end of the vehicle than the frontmost portion, and
   the vehicle frame includes a third cage side member extending in a vertical direction of the vehicle and is connected to the longitudinally extending second cage side member at a rear connection location, the door structure includes a hinge adjacent to the third cage side member such that the door structure is rotatable about an axis at the rearmost portion of the door structure relative to the vehicle.

4. The door barrier assembly for a vehicle according to claim 3, wherein the flexible barrier member includes an upper rear portion attached adjacent the rear connection location such that the flexible barrier member extends along a topmost portion of the window portion of the vehicle from the front connection location to the rear connection location.

5. The door barrier assembly for a vehicle according to claim 4, wherein the vehicle frame includes a rear cross member extending from the rear connection location transversely across the vehicle, and the flexible barrier member includes an adjustable connector located at the upper rear portion attached directly to the rear cross member.

6. The door barrier assembly for a vehicle according to claim 1, wherein the buckle connector structure includes a plate that extends from the first cage cross member towards the window portion of the vehicle at an acute angle with respect to the first cage cross member.

7. The door barrier assembly for a vehicle according to claim 1, further comprising:
the flexible barrier member includes a substantially linear bottom edge opposed to a substantially linear top edge, and the bottom edge includes a first connection structure located at a front lower portion of the flexible barrier member and a second connection structure located at a rear lower portion of the flexible barrier member, and the top edge includes the releasable buckle connector at the upper forward portion of the flexible barrier member releasably attached to the transversely extending first cross cage member.

8. The door barrier assembly for a vehicle according to claim 7, wherein the first connection structure is a permanent non-adjustable connection structure and the second connection structure is an adjustable connection structure.

9. The door barrier assembly for a vehicle according to claim 1, wherein the flexible barrier member includes a web structure.

10. The door barrier assembly for a vehicle according to claim 1, wherein the releasable buckle connector includes a male portion and a female portion, and one of the male portion and female portion is directly connected to the upper forward portion of the flexible barrier member, and an other of the male portion and female portion is located at the first cage cross member.

11. The door barrier assembly for a vehicle according to claim 1, wherein
the flexible barrier member includes a first adjustable connector located at an upper rearward portion of the flexible barrier member, which, in turn, is located at an upper rearward portion of the window portion of the vehicle,
the flexible barrier member includes a second adjustable connector located at a lower rearward portion of the flexible barrier member, which, in turn, is located at a lower rearward portion of the window portion of the vehicle, and
the flexible barrier member includes a permanent connector structure different from the first and second adjustable connector structures, the permanent connector structure located at a lower frontward portion of the flexible barrier member, which, in turn, is located at a lower forward portion of the window portion of the vehicle.

12. The door barrier assembly for a vehicle according to claim 1, further comprising:
a door structure including a top edge further defining the window portion of the vehicle, and the flexible barrier member connected to a front and rear location on the top edge of the door structure; and
a hinge connecting a rear edge of the door structure to the vehicle frame such that a front edge of the door structure is rotatable away from the vehicle frame in order to open the door.

13. A door barrier assembly for a vehicle, comprising:
a first cage side member having a longitudinal axis that is inclined with respect to each of a vertical direction of the vehicle and a longitudinal direction of the vehicle;
a second cage side member having a longitudinal axis extending from a top of the first cage side structure in a longitudinal direction of the vehicle to a rear end of the second cage side structure;
a door structure extending from the first cage side member in the longitudinal direction of the vehicle, wherein the first cage side member, the second cage side member, and a top edge of the door structure define a window portion of the vehicle; and
a flexible barrier member located in the window portion of the vehicle, the flexible barrier member including,
an upper forward portion located at an upper forward portion of the window portion of the vehicle and adjacent the top of the first cage side structure,
a lower forward portion located at a lower forward portion of the window portion of the vehicle and adjacent the first cage side member and the top edge of the door structure,
an upper rearward portion located at an upper rearward portion of the window portion of the vehicle and adjacent the rear end of the second cage side structure,
a lower rearward portion located at a lower rearward portion of the window portion of the vehicle and adjacent a rear portion of the door structure,
a releasable connector attached at the upper forward portion of the flexible barrier member, a second connector attached at the lower forward portion of the flexible barrier member, the second connector being a permanent connector structure fixedly connecting the flexible barrier member to the door structure, a third connector attached at the lower rearward portion of the flexible barrier member, the third connector being an adjustable connector adjustably connecting the flexible barrier member to the door structure, and a fourth connector attached at the upper rearward portion of the flexible barrier member, the fourth connector being an adjustable connector adjustably connecting the flexible barrier member adjacent to the rear end of the second cage side structure.

14. The door barrier assembly for a vehicle according to claim 13, further comprising:
a first cage cross member connected to the top of the first cage side member and extending in a transverse direction across the vehicle; and
a second cage cross member connected to the second cage side member and extending in a transverse direction across the vehicle,
the first cage cross member, the second cage cross member, the first cage side member, and second cage side member defining a portion of a vehicle frame of the vehicle, wherein
the releasable connector includes a male portion and a female portion, and one of the male portion and female portion is attached to the upper forward portion of the flexible barrier member, and an other of the male portion and female portion is attached to the vehicle frame.

15. The door barrier assembly for a vehicle according to claim 14, wherein the other of the male portion and female portion is directly attached to the first cage cross member by a connector bracket.

16. The door barrier assembly for a vehicle according to claim 14, wherein the flexible barrier member includes one of a web and a plastic window, and a first strap attached to an outer perimeter of the one of the web and plastic window, and a second strap attached to the first strap and defining an opening between the first strap and second strap adjacent the one of the web and plastic window, and the one of the male portion and female portion attached to the upper forward portion of the flexible barrier member is attached to the second strap portion at a location intermediate opposite ends of the second strap portion.

17. The door barrier assembly for a vehicle according to claim 13, wherein the vehicle has a front end with steerable wheels, and a rear end, and the door structure has a frontmost portion and a rearmost portion, and the rearmost portion is located closer to the rear end of the vehicle than the frontmost portion,
a hinge is connected between the rearmost portion of the door structure and a frame of the vehicle such that the frontmost portion of the door structure rotates away from the first cage side member in order to open the door structure.

18. The door barrier assembly for a vehicle according to claim 13, wherein the releasable connector includes a male portion and a female portion, and one of the male portion and female portion is attached to the upper forward portion of the flexible barrier member, and an other of the male portion and female portion is attached to the vehicle frame, and wherein the male portion comprises a pair of spring arms for releasable locking to the female portion.

19. An all-terrain vehicle comprising:
a roll cage including an upwardly extending pillar member and a longitudinally extending member connected to the pillar member to form a connection area therebetween;
a flexible barrier member including an upper forward portion; and
a releasably buckle assembly including
a first connector connected to one of the flexible barrier member and adjacent the connection area of the roll cage, and
a second connector connected to an other one of the flexible barrier member and adjacent the connection area of the roll cage and releasable engaged with the first connector such that the flexible barrier member is releasably attachable to the roll cage with the releasable buckle assembly at a location adjacent the connection area;
wherein the flexible barrier member includes one of a web and a plastic window, and a first strap attached to an outer perimeter of the one of the web and plastic window, and a second strap attached to the first strap and defining an opening between the first strap and second strap adjacent the one of the web and plastic window, and the one of the first connector and second connector attached to the upper forward portion of the flexible barrier member is attached to the second strap portion at a location intermediate opposite ends of the second strap portion.

20. The all-terrain vehicle according to claim 19, wherein the opening between the first strap and the second strap forms a triangular shape, and the one of the first connector and second connector is attached at an apex of the triangular shape.

* * * * *